(12) United States Patent
McComb

(10) Patent No.: US 7,665,689 B2
(45) Date of Patent: Feb. 23, 2010

(54) UNCONVENTIONAL INTEGRATED PROPULSION SYSTEMS AND METHODS FOR BLENDED WING BODY AIRCRAFT

(75) Inventor: James G. McComb, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 256 days.

(21) Appl. No.: 11/563,099

(22) Filed: Nov. 24, 2006

(65) Prior Publication Data

US 2008/0121756 A1 May 29, 2008

(51) Int. Cl.
 *B64C 15/02* (2006.01)
(52) U.S. Cl. .......................... 244/12.3; 244/60; 244/62; 244/53 B
(58) Field of Classification Search ................ 244/12.3, 244/60, 62, 53 B; 60/266.1, 262, 269; 137/15.1, 137/15.2
 See application file for complete search history.

(56) References Cited

U.S. PATENT DOCUMENTS

| | | | | |
|---|---|---|---|---|
| 2,989,269 A * | 6/1961 | Le Bel | .......................... | 244/12.3 |
| 3,122,343 A * | 2/1964 | Leibach et al. | ............. | 244/23 B |
| 3,194,516 A * | 7/1965 | Messerschmitt | ............. | 244/74 |
| 3,212,733 A * | 10/1965 | Kutney | .......................... | 244/54 |
| 3,312,426 A * | 4/1967 | Fowler | ........................ | 244/12.5 |
| 3,430,640 A * | 3/1969 | Lennard | ...................... | 137/15.1 |
| 3,983,833 A * | 10/1976 | Eickmann | ........................ | 440/5 |
| 4,068,470 A * | 1/1978 | Sargisson et al. | ............ | 60/226.1 |
| 4,238,094 A * | 12/1980 | McGann | ........................ | 244/91 |
| 4,828,203 A * | 5/1989 | Clifton et al. | ................ | 244/12.3 |
| 5,097,661 A * | 3/1992 | Lair et al. | ..................... | 60/226.2 |
| 5,271,295 A * | 12/1993 | Marnot | ........................ | 74/665 B |
| 5,343,696 A * | 9/1994 | Rohra et al. | ................ | 60/226.2 |
| 5,687,561 A * | 11/1997 | Newton | ...................... | 60/226.1 |
| 6,279,852 B1 * | 8/2001 | Dusserre-Telmon et al. | ... | 244/60 |
| 6,527,224 B2 * | 3/2003 | Seidel | ........................ | 244/53 B |
| 6,688,552 B2 * | 2/2004 | Franchet et al. | ............. | 244/12.3 |
| 6,808,140 B2 * | 10/2004 | Moller | ........................ | 244/12.5 |
| 2004/0025493 A1 * | 2/2004 | Wojciechowski | ............ | 60/224 |
| 2005/0211822 A1 * | 9/2005 | Franchet et al. | ............. | 244/12.3 |
| 2008/0098719 A1 * | 5/2008 | Addis | .......................... | 60/226.1 |

OTHER PUBLICATIONS

Liebeck, "Design of the Blended-Wing-Body Subsonic Transport," American Institute of Aeronautics & Astronautics, 40th AIAA Aerospace Sciences Meeting & Exhibit, Jan. 14-17, 2002, pp. 1-22.

(Continued)

*Primary Examiner*—Tien Dinh
*Assistant Examiner*—Philip J Bonzell

(57) ABSTRACT

Integrated propulsion systems and methods for blended wing aircraft are disclosed. In one embodiment, a propulsion system at least one engine operatively disposed within an engine flow duct having an engine inlet and an engine exhaust aperture, and at least one fan operatively disposed within a fan flow duct having a fan inlet and a fan exhaust aperture. The engine and fan rotational axes extending at least approximately along a lengthwise direction of the aircraft, the fan flow duct being separate from the engine flow duct. A transmission assembly is operatively coupled between the at least one engine and the at least one fan, the transmission assembly being configured to transmit a rotary output from the at least one engine to rotate the at least one fan.

19 Claims, 5 Drawing Sheets

OTHER PUBLICATIONS

"Lockheed Propulsion System", retrieved on Nov. 20, 2006 at <<http://www.vtol.org/Lockheed.htm>>, AHS International, The Vertical Flight Society, 5 pages.

"The Blended Wing Body", retrieved on Nov. 21, 2006 at <<http://oea.larc.nasa.gov/PAIS/BWB.html>>, NASA Facts Online, FS-2001-04-24-LaRC, 4 pages.

* cited by examiner

UNCONVENTIONAL INTEGRATED PROPULSION SYSTEMS AND METHODS FOR BLENDED WING BODY AIRCRAFT

FIELD OF THE INVENTION

The present invention generally relates to aircraft propulsion, and more specifically, to integrated propulsion systems and methods for blended wing body aircraft.

BACKGROUND OF THE INVENTION

Blended wing body (BWB) aircraft are being studied by governmental agencies, universities, and private industry for various applications, including passenger and cargo carrying applications. A BWB may be characterized as a hybrid shape that primarily resembles a flying wing, but also incorporates some features of a conventional aircraft. For example, FIG. 1 shows a conventional BWB aircraft concept 50 in accordance with the prior art. The BWB aircraft 50 includes an efficient, high-lift wing assembly 52, and a central, airfoil-shaped body 54. In the concept shown in FIG. 1, the BWB aircraft 50 includes three engines located in nacelles 56 mounted above the upper surface on pylons 58 near a trailing edge of the BWB aircraft 50. It is desirable to have engines with the highest possible ratio of fan-to-core airflow (bypass ratio) to increase propulsive efficiency. Studies by the National Aeronautics and Space Administration (e.g. research program FS-2001-04-24-LaRC published at http://oea.larc.nasa.gov/PAIS/BWB.html) and other research facilities suggest that a relatively large commercial BWB aircraft designed to carry approximately 450 passengers may advantageously consume 20 percent less fuel than comparable jetliners of today, while cruising at high subsonic speeds on flights of up to 7,000 nautical miles.

While BWB aircraft of the type shown in FIG. 1 may provide desirable results, there is room for further improvement. For example, as the bypass ratio of the engines of the BWB aircraft 50 is increased, the engines and nacelles 56 get bigger and heavier, which makes a low loss integration of the engines on the airframe more difficult, and which also adversely affects the weight and balance of the BWB aircraft 50.

More highly-integrated engine installations having inlets flush mounted on a surface of the BWB aircraft 50 may partially mitigate these adverse effects. The intent of such highly-integrated installations is to ingest a portion of a boundary layer flow that is built up on an upper surface of the BWB aircraft 50. Passing that portion of the boundary layer flow through the engines can improve the overall efficiency, however, a key concern of this approach is pressure distortion in the flow at the engine face (both the fan and core streams) and its resulting impact on engine operability. Also of concern is the shaping of the nacelles, and in particular the channels between the nacelles, to produce shock free and separation free flow so as to minimize drag. Therefore, unconventional integrated propulsion systems and methods for BWB aircraft which mitigate the installation problems discussed above and which can increase the overall capabilities of the engine/airframe system would have utility.

SUMMARY OF THE INVENTION

Embodiments of integrated propulsion systems and methods for blended wing body aircraft in accordance with the present invention are configured to mitigate the undesirable characteristics of the prior art described above. Thus, embodiments of systems and methods in accordance with the present invention may advantageously provide improved weight and balance characteristics, reduced sensitivity to flow distortion and boundary layer ingestion, and improved propulsion system performance in comparison with the prior art.

In one embodiment, an integrated propulsion system for an aircraft includes at least one engine and at least one fan. The fan itself can be part of either a fixed pitch or variable pitch fan assembly. The at least one engine is operatively disposed within an engine flow duct having an engine inlet and an engine exhaust aperture. The at least one fan is operatively disposed within a fan flow duct having a fan inlet and a fan exhaust aperture, the fan flow duct being separate from the engine flow duct. The at least one engine has an engine rotational axis that extends at least approximately along a lengthwise direction of the aircraft, and the at least one fan has a fan rotational axis extending at least approximately along the lengthwise direction of the aircraft. A transmission assembly is operatively coupled between the at least one engine and the at least one fan, the transmission assembly being configured to transmit a rotary output from the at least one engine to rotate the at least one fan. The transmission assembly may be comprised of a gearbox and clutch assembly, input and output shafting. The clutch of the gearbox and clutch assembly may be used to decouple an inoperative fan or engine in the event of a failure.

In alternate embodiments, the at least one fan comprises a plurality of fans, and the fan inlet comprises a common fan inlet configured to provide a fan airflow to the plurality of fans. Similarly, the at least one engine may comprise a plurality of engines, wherein a number of fans is greater than a number of engines. The at least one fan may include a lift fan for providing a lift force.

In another embodiment, an aircraft includes a fuselage; a fan flow duct having a fan inlet and a fan exhaust aperture; at least one fan operatively disposed within the fan flow duct; an engine flow duct having an engine inlet and an engine exhaust aperture, the engine flow duct being separate from the fan flow duct; at least one engine operatively disposed within the engine flow duct; and a transmission assembly operatively coupled between the at least one engine and the at least one fan, the transmission assembly being configured to transmit a rotary output from the at least one engine to rotate the at least one fan.

In yet another embodiment, a method of propelling an aircraft includes providing a fan airflow through a fan inlet and a fan flow duct to at least one fan; providing an engine airflow through an engine inlet and an engine flow duct to at least one engine, the engine flow duct being separate from the fan flow duct; operating the at least one engine to provide a rotary output; transmitting the rotary output via a transmission assembly operatively coupled between the at least one engine and the at least one fan, the transmission assembly being configured to transmit the rotary output from the at least one engine to rotate the at least one fan; and rotating the at least one fan to provide a fan thrust.

BRIEF DESCRIPTION OF THE DRAWINGS

Embodiments of the present invention are described in detail below with reference to the following drawings.

DETAILED DESCRIPTION

The present invention relates to integrated propulsion systems and methods for blended wing body (BWB) aircraft. Many specific details of certain embodiments of the invention are set forth in the following description and in FIGS. 2-8 to provide a thorough understanding of such embodiments. One skilled in the art, however, will understand that the present invention may have additional embodiments, or that the present invention may be practiced without several of the details described in the following description.

Figure 1:
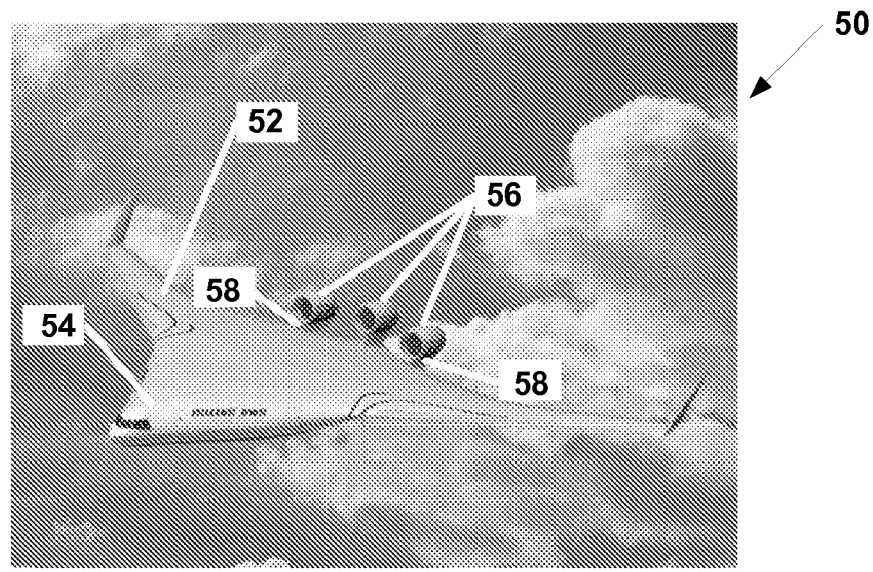
FIG. 1 is an isometric view of a blended wing body aircraft in accordance with the prior art.
Figure 2:
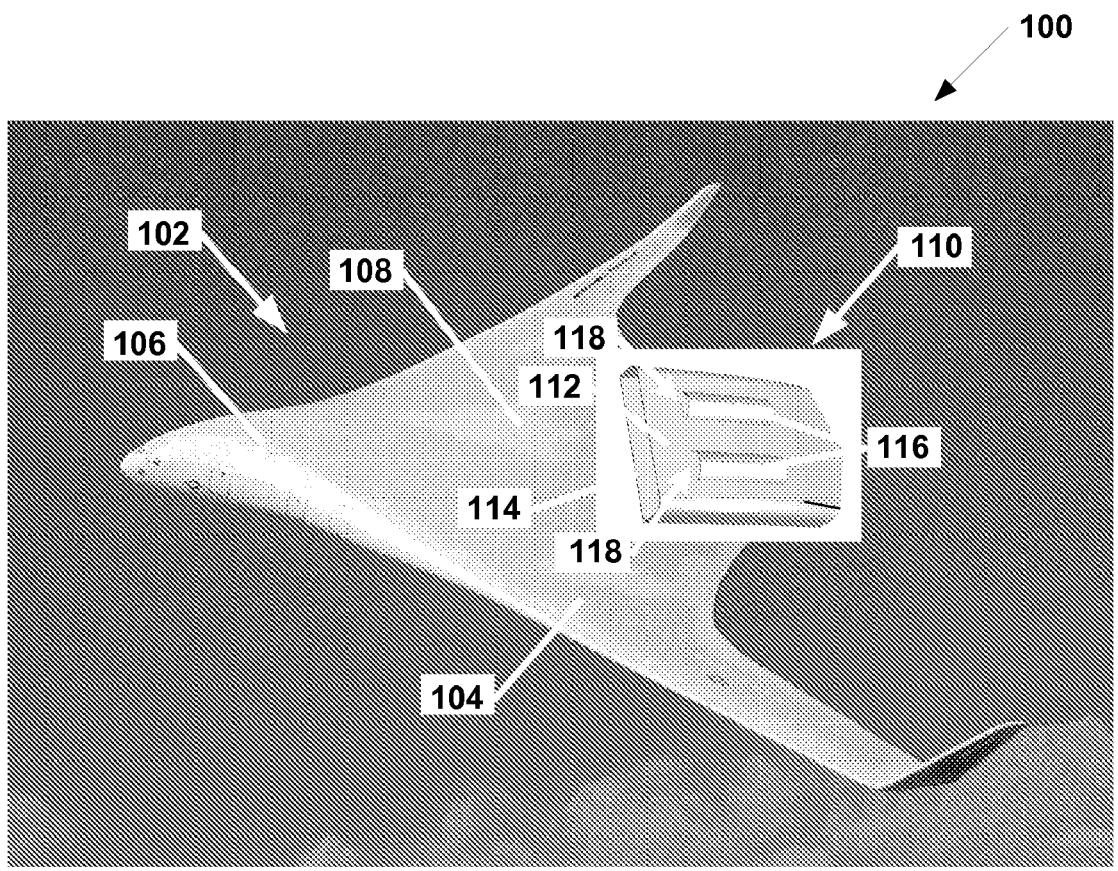
FIG. 2 is an isometric view of a blended wing body aircraft in accordance with an embodiment of the present invention.

FIG. 2 is an isometric view of a blended wing body aircraft 100 in accordance with an embodiment of the present invention. In this embodiment, the BWB aircraft 100 includes an airframe 102 having blended wing and body portions 104, 106, and an integrated propulsion system 110 disposed on an upper surface 108 of the airframe 102. The integrated propulsion system 110 provides propulsion power for the BWB aircraft 100. As described more fully below, the integrated propulsion system 110 may provide significant advantages over prior art propulsion systems.

Figure 3:
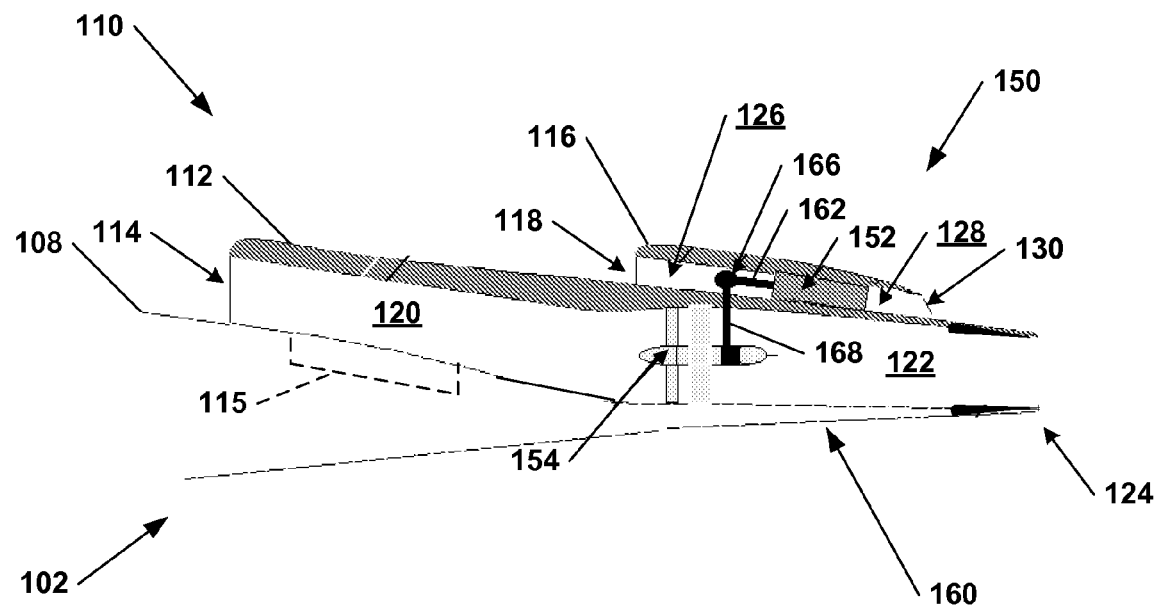
FIG. 3 is a side cross-sectional schematic view of an integrated propulsion system of the BWB aircraft of FIG. 2 in accordance with another embodiment of the invention.

FIG. 3 is a side cross-sectional view of the integrated propulsion system 110 of FIG. 2. The integrated propulsion system 110 includes a fan system cowl 112 that is spaced apart from the upper surface 108 of the airframe 102 to form a fan system inlet 114. Similarly, one or more shaft engine cowls 116 are spaced apart from the fan system cowl 112 to form one or more shaft engine inlets 118. As best shown in FIG. 2, in this embodiment, the integrated propulsion system 110 includes a single fan system inlet 114, and a pair of shaft engine inlets 118.

Figure 4:
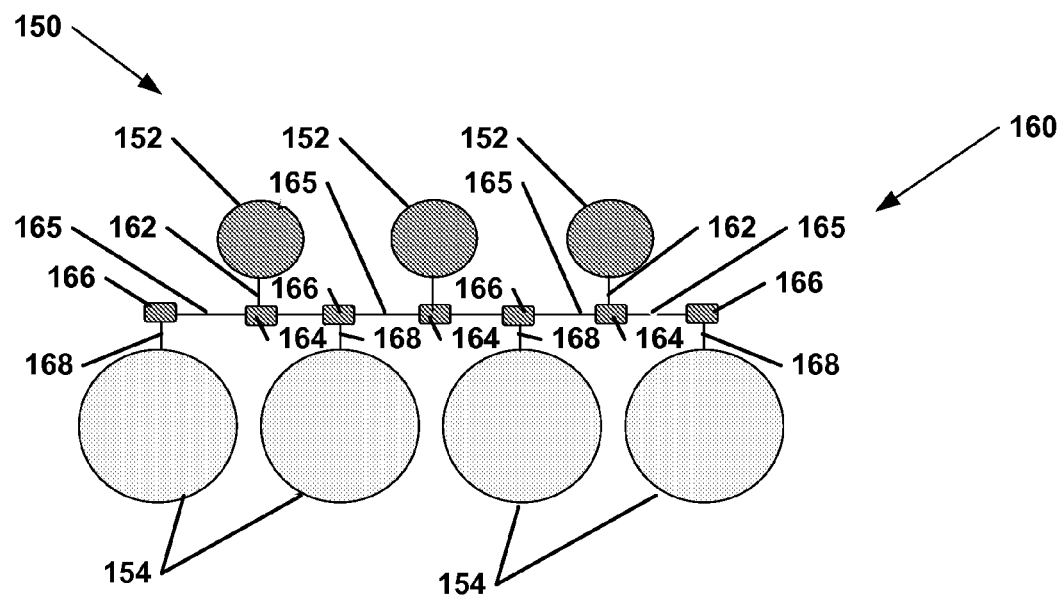
FIG. 4 is a front elevational view of one possible arrangement of an engine assembly of the propulsion system of FIG. 3.

As further shown in FIG. 3, the fan system inlet 114 leads to a fan system diffuser 120 that feeds flow into a fan system that exhausts flow into a fan system exhaust duct 122, and eventually, to a fan system nozzle assembly 124. Each shaft engine inlet 118 is similarly connected to a shaft engine diffuser 126 that feeds flow into a shaft engine that exhausts flow into a shaft engine exhaust duct 128 and a shaft engine exhaust assembly 130. In this embodiment, the fan system inlet 114, fan system cowl 112, and fan system nozzle assembly 124 are generally two-dimensional (2-D) configurations, but the fan system diffuser will contain appropriately shaped 2-D to circular transition ducting in front of the fan, and the fan exhaust duct will contain appropriately shaped circular to 2-D transition ducting downstream of the fan. In addition, the leading edge shape of the fan inlet system and the trailing edge shape of the fan nozzle system may deviate from a 2-D shape to enhance stealth capability The integrated propulsion system 110 also includes an engine assembly 150 integrated with the other components of the integrated propulsion system 110 to provide propulsive power for the blended wing body aircraft 100. More specifically, FIG. 4 is a front elevational view of one possible arrangement of the engine assembly 150 of the integrated propulsion system 110 of FIG. 3. In this embodiment, the engine assembly 150 includes a plurality of engines 152 operatively coupled to a plurality of fans 154 by a transmission assembly 160. The transmission assembly 160 includes a plurality of engine shafts 162 that are operatively coupled between the engines 152 and a corresponding plurality of engine gearbox/clutch assemblies 164. In turn, each engine gearbox/clutch assembly 164 is coupled by one or more cross shafts 165 to one or more fan gearbox/clutch assemblies 166. A fan shaft 168 extends from each of the fan gearbox/clutch assembly 166 to a corresponding one of the fans 154. Clutches are desirable to allow failed fans or engines to be decoupled from the integrated propulsion system.

In some embodiments, the engines 152 are turboshaft engines, however, in alternate embodiments, any other suitable engine types may be used. In one particular embodiment, the integrated propulsion system 110 includes three engines 152 that power four fans 154, as shown in FIG. 4. In alternate embodiments, other numbers of engines 152 and fans 154 may be used, with the optimum numbers of engines and fans typically being determined via trade studies that may depend on such variables as anticipated mission characteristics, aircraft design characteristics, or other variables or characteristics.

The transmission system is used to allow all fans 154 to be powered in the event of the failure of one of the engines 152. The number of engines 152 can be and will generally be less that the number of fans 154. Since the ratio of the total amount of flow through all the fans 154 divided by the total amount of flow through all the engines (or gas generators) 152 is the bypass ratio, the optimum value of the bypass ratio can also be determined through trade studies. Consequently, the fuel consumption benefits of ultra-high-bypass-ratio (UHBR) engines can be achieved with the integrated propulsion system 110 without the adverse consequence of very large diameter fans and nacelles.

In the embodiment shown in FIGS. 3 and 4, the integrated propulsion system 110 is configured with the engines 152 mounted above the fans 154. The rotational axes of the engines 152 and the fans 154 extend at least approximately along a lengthwise direction of the aircraft. Airflow enters the fans 154 and the engines 152 through separate fan and engine inlets 114, 118, and exhausts through separate fan and engine nozzle assemblies 124, 130. The fan inlet 114 feeding flow to the fans 154 may incorporate an active flow control (AFC) system 115 to help minimize the flow distortion entering the fans 154. The fans 154 may be a distortion tolerant design. These design features may enable boundary layer ingestion (BLI) into the fan inlet 114. The design of the engine inlet 118 feeding the shaft engines 152 may be fairly conventional, and may or may not include a boundary layer diverter. The air induction features described above may advantageously produce good operability characteristics of the engine assembly 160 and the overall integrated propulsion system 110.

Embodiments of systems and methods in accordance with the present invention may provide significant advantages over the prior art. For example, embodiments of integrated propulsion systems in accordance with the invention may enable increased boundary layer ingestion, improved optimization of the overall bypass ratio of the system, and may lessen the risk of having engine operability problems due to distorted flow profiles entering the fan inlet 114 and the engines 152. Embodiments of the invention may also reduce or eliminate the problems due to shocks and flow separations caused by channels disposed between nacelles associated with the prior art designs. In addition, embodiments of the invention may advantageously enable thrust vectoring and reversing, and may reduce or minimize the amount of asymmetric thrust that will exist with the loss of an outboard engine 152. Embodiments of the invention may also lend themselves to incorporating stealth features for military applications, and enable short takeoff and landing (STOL) and possibly vertical takeoff and landing (VTOL) operation by the logical addition of shaft driven lift fans, as described more fully below.

It will be appreciated that alternate embodiments of integrated propulsion systems and methods in accordance with the present invention may be conceived, and that the invention is not limited to the particular embodiments described above and shown in FIGS. 1-4. For example, as noted above, the embodiment described above features the engines 152 located on top of, and downstream of, the fans 154. In alternate embodiments, however, the shaft engines 152 could also be located forward of the fans 154, and in still other embodiments, the engines 152 could be located below the fans 154. In further embodiments, the axial positions of the shaft engines 152 can be staggered relatively to each other to protect against a rotor burst damaging adjacent engine hardware or critical aircraft systems. The optimum arrangement of the engines 152 and fans 154 may vary depending on, for example, the mission and design characteristics of the BWB aircraft 100.

Figure 5:
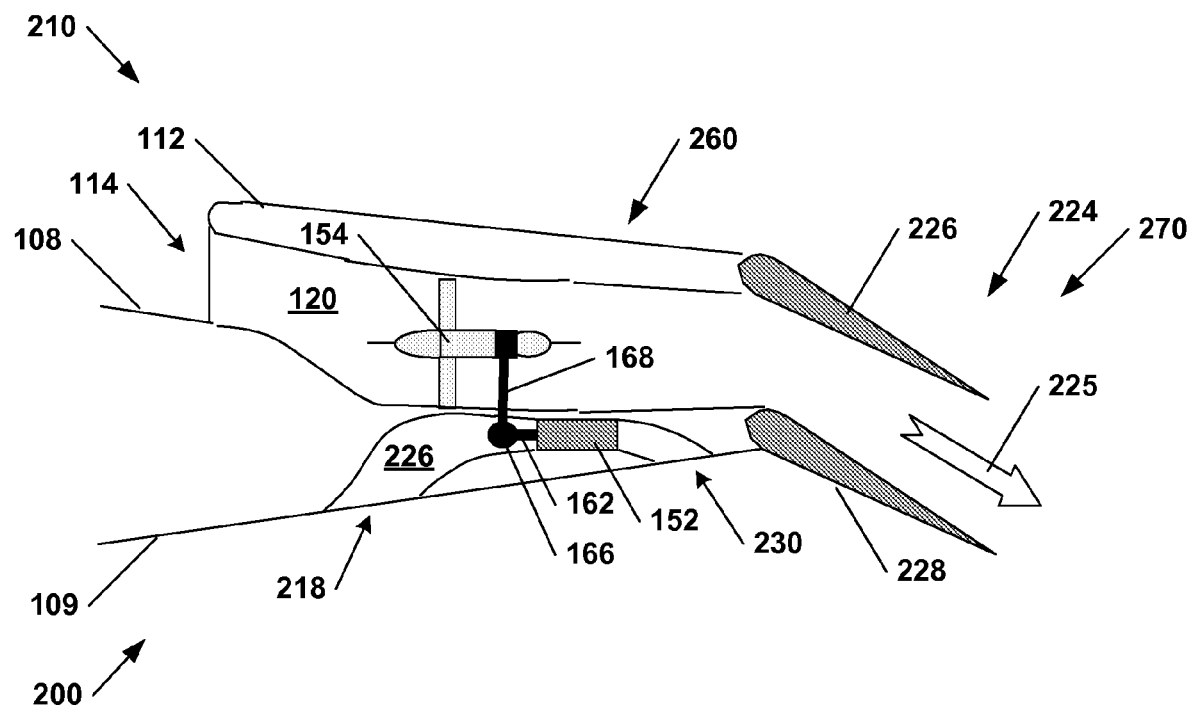
FIGS. 5 through 7 are side cross-sectional views of integrated propulsion systems in accordance with further embodiments of the invention.

For example, FIG. 5 is a side cross-sectional view of an integrated propulsion system 210 of a BWB aircraft 200 in accordance with an alternate embodiment of the invention. Many of the components of the integrated propulsion system 210 are similar or identical to the components described above, and for the sake of brevity, a complete description of these components will not be repeated herein. Therefore, the following descriptions of alternate embodiments will primarily focus on a few substantially different aspects of each embodiment.

As shown in FIG. 5, the integrated propulsion system 210 includes an engine and transmission assembly 260 having the fans 154 positioned above and forward of the engines 152. A flush-mounted engine inlet 218 is disposed in a lower surface 109 of the BWB aircraft 200. Similarly, an exhaust flow from the engines 152 is exhausted through a flush-mounted exhaust aperture 230 that is also flush-mounted in the lower surface 109. In this embodiment, the integrated propulsion system 210 includes a fan exhaust assembly 224 having upper and lower flaps 226, 228 that can be controllably adjusted to provide variable geometry for proper performance over a range of operating conditions, as well as for various desired modes of operation.

For example, in a thrust vectoring mode 270 as shown in FIG. 5, the upper and lower nozzle flaps 226, 228 are controllable adjusted to direct a thrust vector 225 in a desired direction. The thrust vector 225 may be directed upwardly or downwardly as desired for various purposes, including for improved maneuverability of the BWB aircraft 200. Alternately, the direction of the thrust vector 225 can be modulated to trim the BWB aircraft 200 in flight, and to provide control forces. Also, the fan nozzle exit area can also be modulated for all flap positions, allowing the fans 152 to operate on the optimum operating line over a variety of operating conditions.

Figure 6:
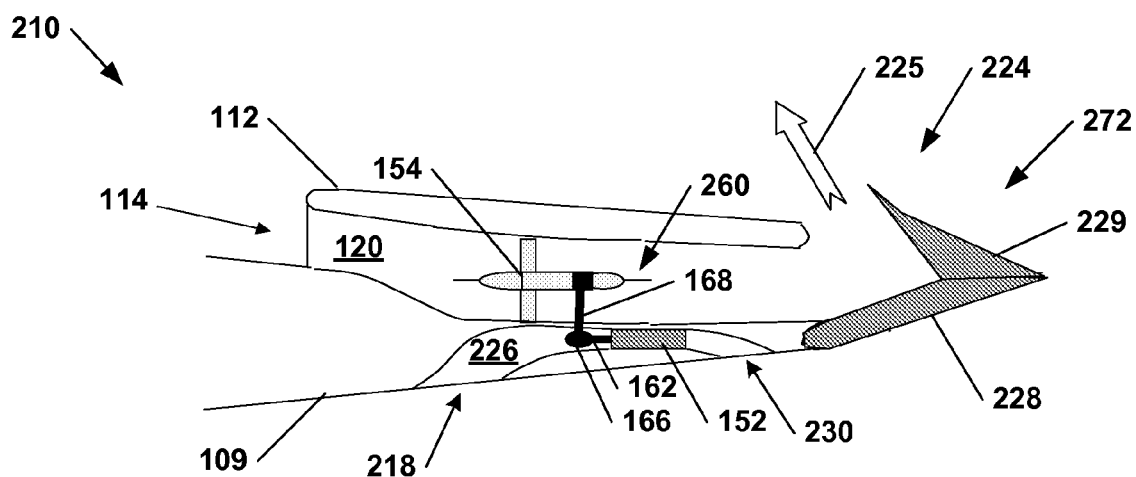

Similarly, in a thrust reversing mode 272 as shown in FIG. 6, the upper nozzle flap 226 may be retracted (or otherwise stowed), and a reverser portion 229 of the lower nozzle flap 228 may be articulated to redirect the thrust vector 225 into a partially forward direction, thereby providing thrust reversing. It will be appreciated that in an alternate embodiment, the fan nozzle assembly 224 may be reconfigured such that the upper nozzle flap 226 includes the reverser portion 229 and the lower nozzle flap 228 is stowable such that the thrust vector 225 is redirected downwardly and forwardly to provide the desired thrust reversing capability. In still other embodiments, alternate embodiments of thrust reversers (or fan nozzle assemblies) can be designed with portions of the fan exhaust flow directed up and down, and at different flow angles.

Figure 7:
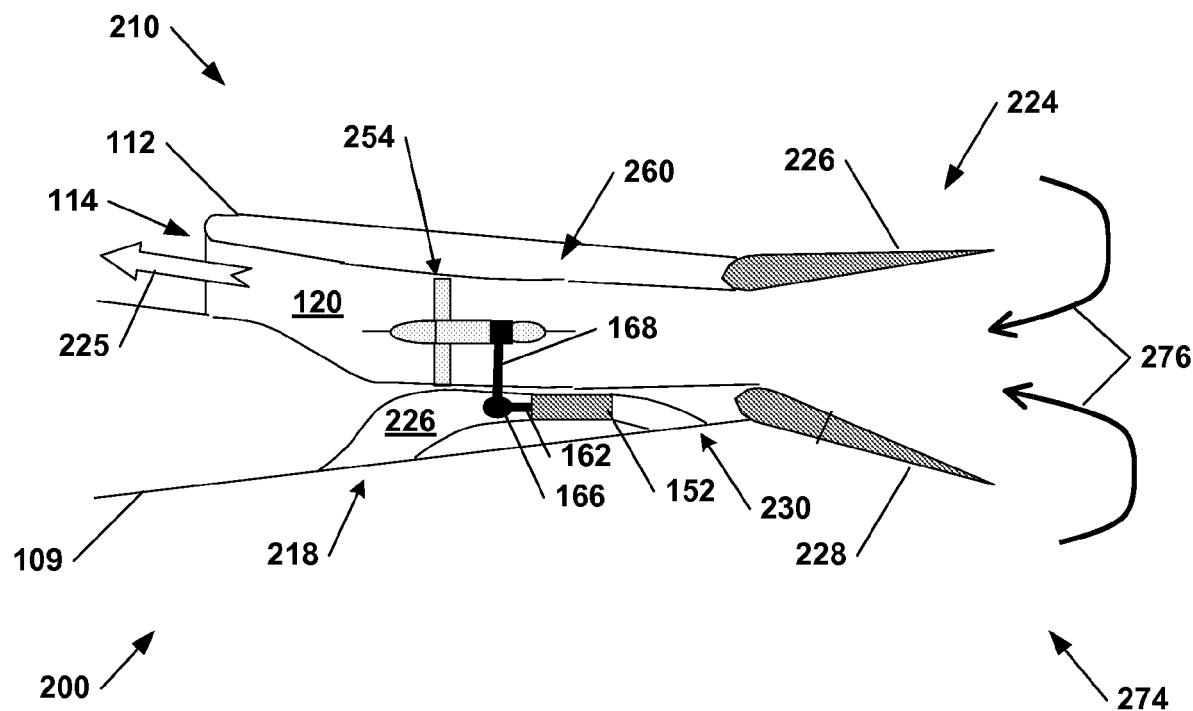

In another embodiment, the fans may be variable pitch fans 254 which include reverse pitch capability configured to enable the airflow through the fans 254 to be reversed. Thus, in an alternate thrust reversing mode 274 as shown in FIG. 7, the variable pitch fans 254 may be positioned to reverse the flow direction through the fans 254. The fan nozzle assembly 224 may be opened to provide a relatively large fan stream nozzle area that is used as an inlet to receive reversing airflow 276, which is then expelled through the fan inlet 114, resulting in the thrust vector 225 being directed at least partially in the forward direction.

Although the thrust vectoring and thrust reversing modes 270, 272, 274 have been described above in association with the integrated propulsion system 210 embodiment, it will be appreciated that these modes of operation are not limited to the particular embodiment shown in FIGS. 5-7, and that other embodiments of integrated propulsion systems in accordance with the invention (e.g. the integrated propulsion system 110 shown in FIGS. 2-4) may also be configured to be operated in one or more of these modes of operation. In further embodiments, integrated propulsion systems and methods in accordance with the invention can also include provisions for cooling the core exhaust system by using cooling air from the compressor, the fan stream or free stream flow. The temperature of the exhaust gas can be reduced by mixing that flow with either ambient air or fan exhaust air. Hot parts can be shielded by proper shaping of the nozzle. There may be variable geometry requirements for the fan and engine nozzle assemblies depending on the cycle selection and details of any low observable design requirements.

Figure 8:
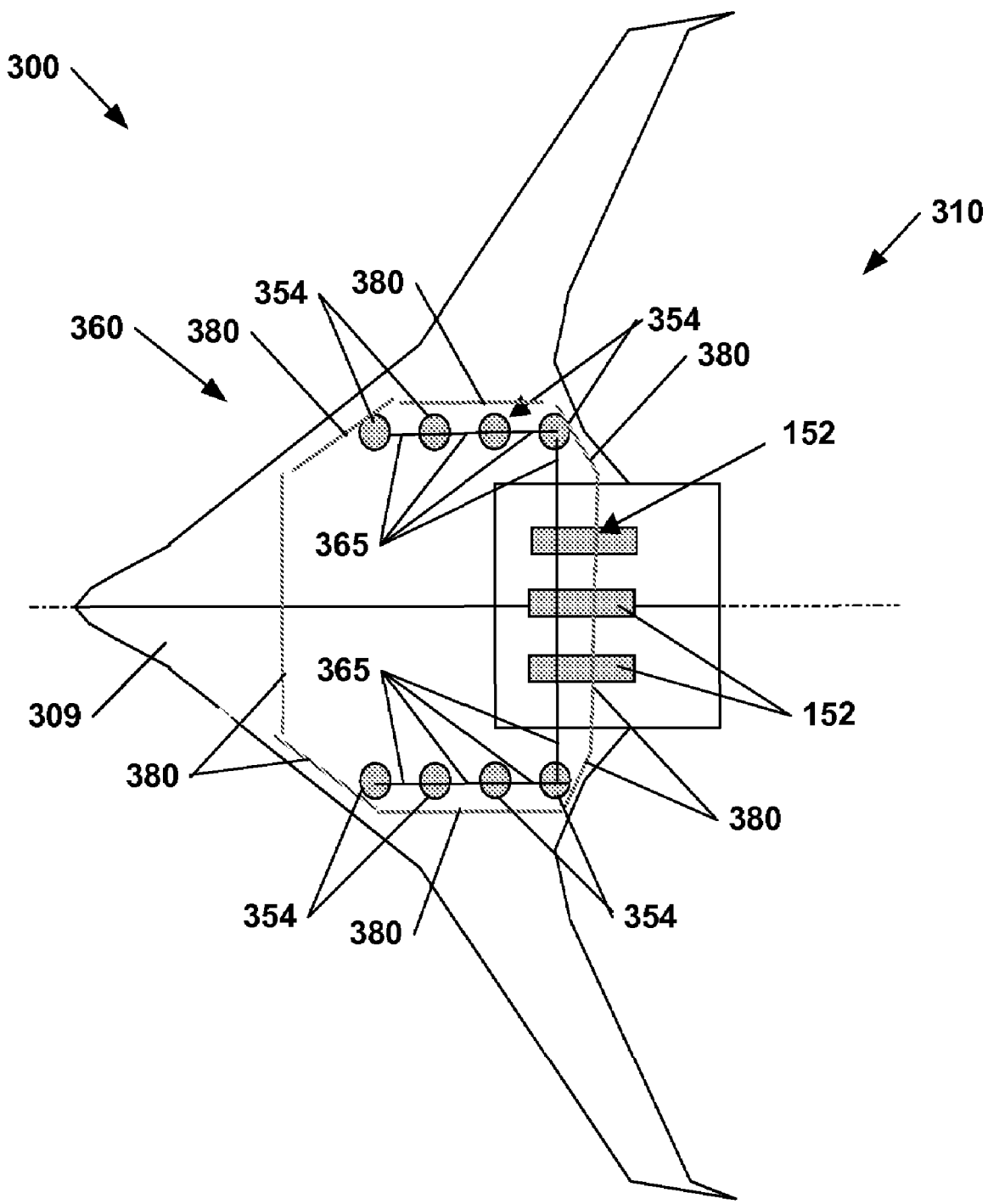
FIG. 8 is a lower plan view of a BWB aircraft in accordance with another alternate embodiment of the invention.

Embodiments of the invention can also be conceived and incorporated into BWB aircraft having vertical lift capabilities for vertical and short takeoff and landing (VSTOL or STOL) maneuvers. For example, FIG. 8 is a lower plan view of a BWB aircraft 300 having vertical lift capabilities in accordance with another alternate embodiment of the invention. In this embodiment, the BWB aircraft 300 includes an integrated propulsion system 310 that may (or may not) operate according to any of the previously-described embodiments for forward flight operations. In addition, however, the integrated propulsion system 310 has an engine and transmission assembly 360 that includes a plurality of lift fans 354 that are operatively coupled to the engines 152 by a plurality of lift fan cross shafts 365 (and fan gearboxes and clutch assemblies 166 and fan shafts 168 as shown in FIG. 4). In some embodiments, one or more flow fences 380 may be added to a lower surface 309 of the BWB aircraft 300 and disposed about the plurality of lift fans 354. The fences 380 may provide improved "soft field" operating capabilities. The flow fences 380 may at least partially pressurize the lower surface 309 of the vehicle 300 when the lift fans 354 are running, and in some embodiments and certain operating conditions, may effectively convert the BWB aircraft 300 into a ground effect vehicle.

Embodiments of systems and methods in accordance with the present invention may provide significant advantages over the prior art. For example, embodiments of the invention may advantageously provide improved weight and balance characteristics, reduced sensitivity to flow distortion and boundary layer ingestion, and improved propulsion system performance in comparison with the prior art. Embodiments of the invention may also provide improved optimization of the overall bypass ratio of the engine system, and may lessen the risk of having engine operability problems due to distorted flow profiles entering the fan system and the engines. Embodiments of the invention may also reduce or eliminate the problems due to shocks and flow separations caused by channels disposed between nacelles associated with the prior art designs. In addition, as described above, embodiments of the invention may desirably enable thrust vectoring and reversing, and may reduce or minimize the amount of asymmetric thrust that will exist with the loss of one outboard engine. Further embodiments of the invention may also lend themselves to incorporating stealth features for military applications, and may also enable STOL and possibly VTOL operation by the logical addition of shaft driven lift fans.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An aircraft comprising:
an airfoil-shaped body;
a plurality of fans having separate fan axes;
a fan cowl on a surface of the body for forming a fan passageway for the plurality of fans, the fan passageway having a flush inlet;
a plurality of engine cowls on at least one of an upper surface of the fan cowl and an opposite surface of the body; and
a plurality of turbine engines for driving the fans, each engine inside an engine cowl;
wherein the fan cowl is on an upper surface of the body and the engine cowls are on an upper outer surface of the fan cowl.

2. An aircraft comprising:
an airfoil-shaped body;
a plurality of fans having separate fan axes;
a fan cowl on a surface of the body for forming a fan passageway for the plurality of fans, the fan passageway having a flush inlet;
a plurality of engine cowls on at least one of an upper surface of the fan cowl and an opposite surface of the body; and
a plurality of turbine engines for driving the fans, each engine inside an engine cowl;
wherein the fan cowl is on an upper surface of the body; and wherein the engine cowls are on a lower surface of the body.

3. A Blended Wing Body (BWB) aircraft comprising:
an airfoil-shaped fuselage;
a plurality of fans having separate fan axes;
a fan cowl on a surface of the fuselage for forming a fan passageway for the plurality of fans, the fan passageway having a flush inlet;
a plurality of engine cowls on at least one of an upper surface of the fan cowl and an opposite surface of the fuselage; and
a plurality of turbine engines for driving the fans, each engine inside an engine cowl.

4. The aircraft of claim 3, wherein the plurality of fans receive a fan airflow from the fan inlet, and wherein the each of the plurality of engines receives an engine airflow from a corresponding engine inlet.

5. The aircraft of claim 3, wherein the fan cowl is on an upper surface of the fuselage, and the engine cowls are on a lower surface of the fuselage.

6. The aircraft of claim 3, wherein a number of fans is greater than a number of engines.

7. The aircraft of claim 3, wherein the fans an engine are located behind a leading edge of the fuselage.

8. The aircraft of claim 3, further comprising active flow control at the fan inlet to reduce flow distortion.

9. The aircraft of claim 3, wherein the fan cowl is on an upper surface of the fuselage and the engine cowls are on an upper outer surface of the fan cowl.

10. The aircraft of claim 3, further comprising a fan nozzle assembly operatively coupled to a fan exhaust aperture and having a plurality of flaps configured to provide at least one of a thrust vectoring and a thrust reversing.

11. The aircraft of claim 10, wherein the fan nozzle assembly is configured to provide a thrust reversing, and wherein the fan nozzle assembly includes an upper flap and a lower flap, and wherein at least one of the upper and lower flaps includes an articulable reverser portion configured to be articulated to provide the thrust reversing.

12. The aircraft of claim 10, wherein the fan nozzle assembly is configured to provide a thrust reversing, and wherein the at least one fan includes a variable pitch fan configured to reverse a fan flow through the fan duct to provide the thrust reversing.

13. The aircraft of claim 3, further comprising:
a transmission assembly operatively coupled between at least one engine and the plurality of fans, the transmission assembly being configured to transmit a rotary output from the at least one engine to rotate the fans.

14. The aircraft of claim 13, wherein a number of fans is greater than a number of engines.

15. The aircraft of claim 13, further comprising a fan nozzle assembly operatively coupled to a fan exhaust aperture and configured to provide thrust reversing, and wherein the at least one fan includes a variable pitch fan configured to reverse a fan flow through the fan duct to provide the thrust reversing.

16. The aircraft of claim 13, wherein the transmission assembly includes:
at least one engine shaft operatively coupled to the at least one engine;
at least one engine gearbox and clutch assembly operatively coupled to the at least one engine shaft;
at least one cross shaft extending laterally with respect to the at least one engine shaft and operatively coupled to the at least one engine gearbox and clutch assembly;
at least one fan gearbox and clutch assembly operatively coupled to the at least one cross shaft; and
at least one fan shaft operatively coupled between the at least one fan gearbox and clutch assembly and the at least one fan.

17. The aircraft of claim 16, wherein the at least one fan comprises a first fan and a second fan, the at least one fan shaft comprises a first fan shaft, the at least one fan gearbox and clutch assembly comprises a first fan gearbox and clutch assembly, and the at least one cross shaft comprises a first cross shaft, the transmission assembly further including:
a second cross shaft extending laterally with respect to the at least one engine shaft and operatively coupled to the at least one engine gearbox and clutch assembly;
a second fan gearbox and clutch assembly operatively coupled to the second cross shaft; and a second fan shaft operatively coupled between the second fan gearbox and clutch assembly and the second fan.

18. The aircraft of claim 13, further comprising at least one lift fan disposed within a lift fan duct and configured to provide a lifting force, wherein the transmission assembly is operatively coupled between the at least one engine and the at least one lift fan, the transmission assembly being configured to transmit the rotary output from the at least one engine to rotate the at least one lift fan.

19. The aircraft of claim 18, wherein the lift fan duct extends between an upper surface of the aircraft and a lower surface of the aircraft, the system further comprising at least one fence member projecting downwardly from the lower surface proximate the lift fan duct, the at least one fence member being configured to provide an increased pressure on the lower surface during operation of the at least one lift fan.

* * * * *